Dec. 14, 1954

E. G. JOHANSSON 2,697,185

MOUNTING FOR ELECTRICAL INSTRUMENTS

Filed Sept. 6, 1951

WITNESSES:
Robert C Baird
Wm. L. Groove

INVENTOR
Ernest G. Johansson.
BY C. L. Freedman
ATTORNEY

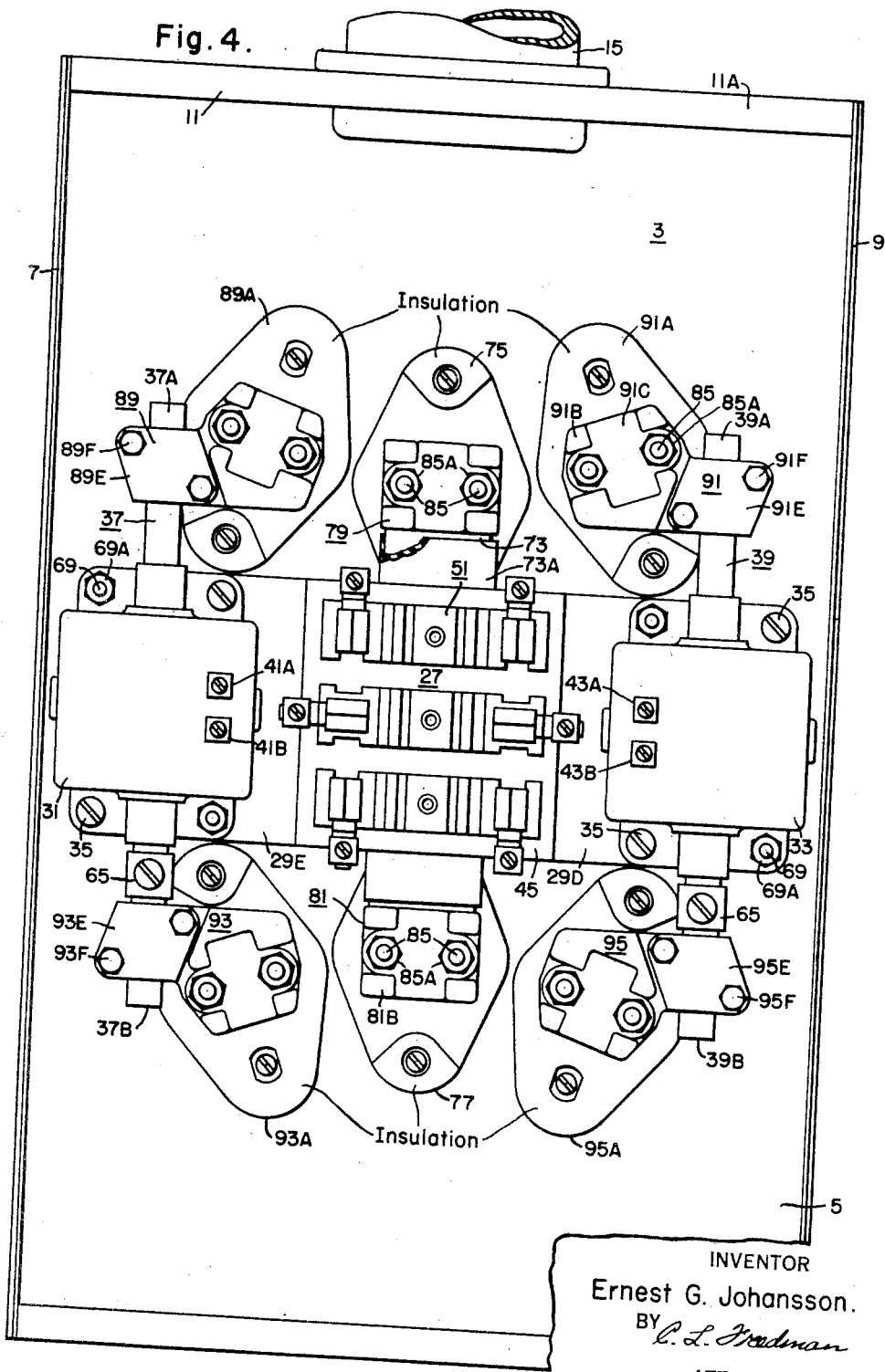

Dec. 14, 1954    E. G. JOHANSSON    2,697,185
MOUNTING FOR ELECTRICAL INSTRUMENTS
Filed Sept. 6, 1951
4 Sheets-Sheet 4

WITNESSES:
Robert C. Baird
Wm. L. Groome

INVENTOR
Ernest G. Johansson.
BY C. L. Freedman
ATTORNEY

United States Patent Office 2,697,185
Patented Dec. 14, 1954

2,697,185
MOUNTING FOR ELECTRICAL INSTRUMENTS

Ernest G. Johansson, Belmont, Mass., assignor to Westinghouse Electric Corporation, East Pittsburgh, Pa., a corporation of Pennsylvania Application September 6, 1951, Serial No. 245,408

30 Claims. (Cl. 317—99)

This invention relates to mountings for electrical instruments, and it has particular relation to mountings containing transformers through which instruments are energized.

Aspects of the invention are suitable for mountings designed to receive numerous types of instruments. Certain aspects of the invention are particularly suitable for detachable instruments which are also known as socket instruments. Although the socket construction has been employed for various instruments such as relays and indicating instruments, the invention will be discussed with particular reference to socket meters. Such meters are well known in the art and descriptions thereof will be found in the Electrical Metermen's Handbook, published in 1940 by The Edison Electric Institute of New York city. Meters of this type also are shown in numerous patents such as the Bradshaw et al. Patent 1,969,499 and the Bradshaw Patent 2,081,981.

In accordance with the invention, a mounting for receiving an electrical instrument includes an enclosure which contains releasable transformer means. Preferably, the transformer means are arranged for installation or removal as a unit, which will be referred to as a "removable unit."

The removable unit may include a group of transformers through which an instrument is to be energized. In one preferred embodiment of the invention, the removable unit also includes in addition to the transformer means a socket for reception of a socket meter or electrical instrument. In another embodiment of the invention, the enclosure may have a hinged panel for reception of the electrical instrument. The hinged panel then may be moved about its hinge for the purpose of exposing the removable unit which includes the transformer means.

In order to facilitate release of the removable unit from the associated enclosure, the enclosure contains connector units designed for reception of the primary leads of the transformer means. In a preferred embodiment of the invention, the primary leads of the transformer means are of rigid construction and are releasably clamped in the connector units.

The connector units also have provision for receiving or clamping conductors which enter or leave the enclosure. Such conductors may comprise the customary line and load conductors. In some cases, one of the conductors passes through the enclosure and does not require connection to an electrical instrument mounted thereon. Preferably, the removable unit clears such a conductor to permit removal of the unit without disturbing the conductor.

The invention facilitates the separate installation of the enclosure and the removable unit. For example, a building contractor may install the enclosure complete with connector units in a building which he is constructing. When the customer is to be supplied with electrical energy, the appropriate public utility may install the removable unit in the enclosure and may attach an electrical meter thereto.

It is, therefore, an object of the invention to provide an improved mounting for electrical instruments which includes a removable transformer unit.

It is a second object of the invention to provide a mounting for socket instruments which comprises an enclosure within which a removable unit including a socket and a transformer means is releasably positioned.

It is a third object of the invention to provide a removable unit comprising a plurality of transformers secured to a common support.

It is a fourth object of the invention to provide a removable unit which includes a transformer means and a socket secured to a common support.

It is a fifth object of the invention to provide an enclosure having a hinged support for mounting electrical instruments.

It is a sixth object of the invention to provide an enclosure having a hinged support located therein for reception of an electrical instrument and having a removable transformer unit located within the enclosure.

Other objects of the invention will be apparent from the following description taken in conjunction with the accompanying drawings, in which:

Fig. 4 is a view in front elevation of the mounting of Fig. 1 with the cover section removed and with parts broken away.

Fig. 5 is a detail view in elevation of one of the connector units employed in the mounting of Fig. 1.

Fig. 6 is a detail view in section showing the construction of an insulating assembly employed in the mounting of Fig. 1.

Figure 1:
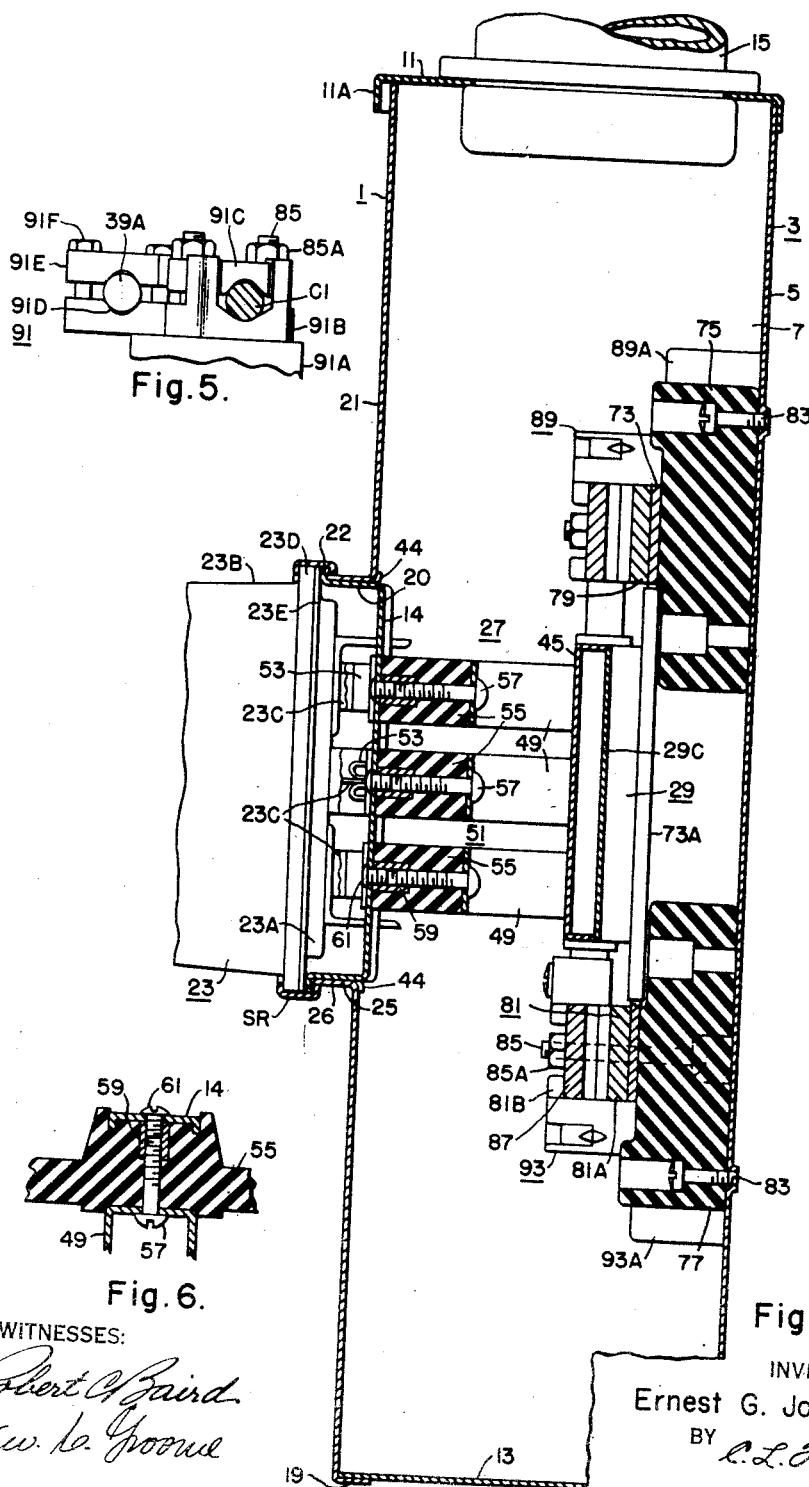
Figure 1 is a view in cross-section of a mounting having an electrical instrument associated therewith and embodying the invention.
Figure 3:
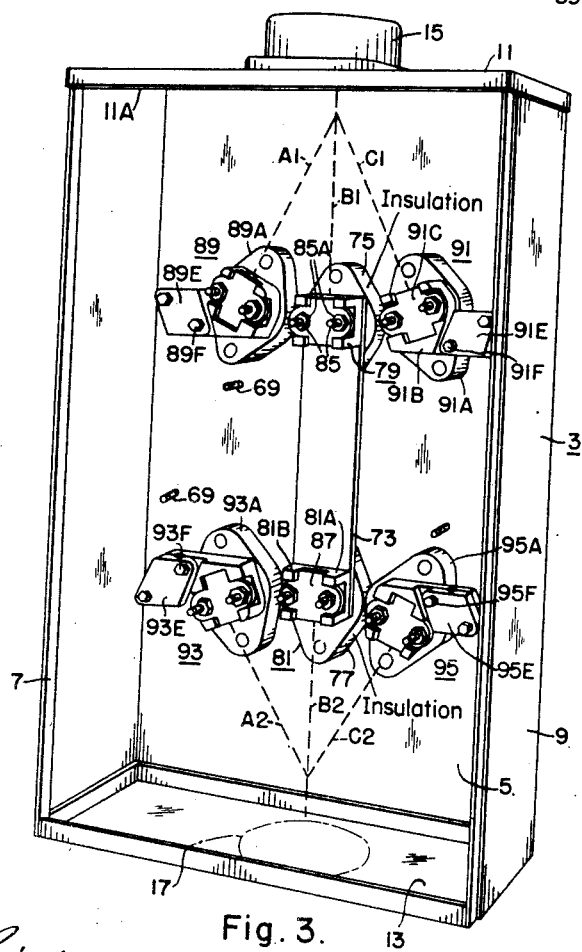
Fig. 3 is a view in perspective of a portion of the mounting of Fig. 1, with connector units mounted therein.

Referring to the drawings, Fig. 1 shows an enclosure which is in the form of a box having a cover section 1 and a base section 3. As shown in Fig. 3, the base section 3 has a rear wall 5, side walls 7 and 9, a top wall 11 and a lower wall 13. The base section also has provision for permitting the entry or departure of conductors into or out of the enclosure. For example, a bushing 15 is secured to the upper wall 11 for reception of conventional conduit through which conductors may be supplied to the enclosure. In addition, the lower wall 13 may be scored, as represented by a line 17, to provide a circular weakened part which may be removed readily from the lower wall to permit attachment of conduit thereto.

Referring again to Fig. 1, it will be noted that the cover section 1 provides a front wall 21 for the enclosure and has a flange 19 which may extend around three sides of the cover section. The walls 7, 9 and 13 of the base section are received within the flange 19 of the cover section. The upper part of the cover section fits within a flange 11A which is bent downwardly from the upper wall 11.

The enclosure of Fig. 1 is designed for reception of an electrical instrument 23 which will be assumed to be a detachable or socket meter. As well understood in the art, the socket meter includes a base or pie-plate 23A which has a cup-shaped glass cover 23B releasably secured thereto. A meter is enclosed within the casing formed by the pie-plate 23A and the glass cover 23B. A plurality of contact blades 23C project from the pie-plate 23A and are insulated from each other. These contact blades constitute terminals for the meter which is secured to the pie-plate. The cover 23B and the pie-plate 23A have flanges respectively, 23D and 23E which are utilized in securing the meter to its mounting.

As shown in Fig. 1, the cover section 1 has an opening 25 which is surrounded by a collar 26. The cover section may be formed of a suitable metal such as steel or aluminum, and the collar may be drawn or extruded from a sheet of the metal employed in fabricating the cover section.

A ring 20 is rotatably located within the collar 26. This ring 20 has a flange 22 which extends around the edge of the collar 26. In addition, the ring 20 has a cross bar 14 which extends diametrically across the ring. The cross bar 14, the ring 20, the flange 22 and the collar 26 may be identical with parts bearing the same reference characters shown in the Young Patent 2,242,637, which issued May 20, 1941. The edge 44 of the ring 20 may be left in the form shown in Fig. 4 of the aforesaid Young patent to permit removal of the ring 20 from the collar 26. Preferably, however, the edge 44 is crimped over the front wall 21 in the manner illustrated in Fig. 5 of the aforesaid Young patent. However, the crimping should be to an extent merely sufficient to retain the ring 20 in its mounted position and should not interfere with rotation of the ring relative to the collar 26. As will be pointed out below, the rotation of the ring is employed to permit either vertical or horizontal mounting of the enclosure, as desired.

Figure 2:
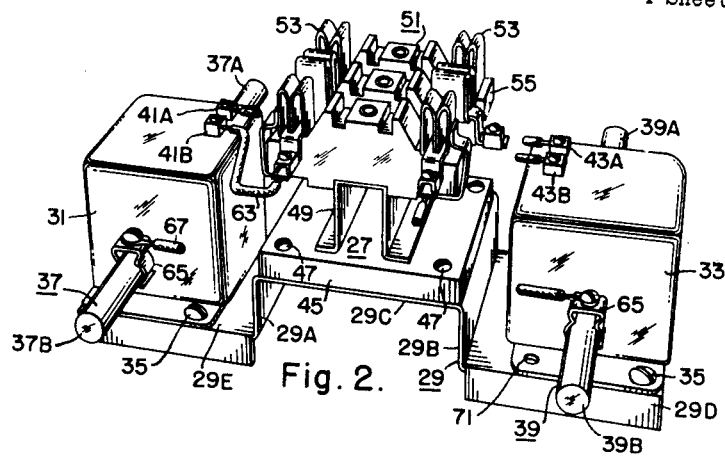
Fig. 2 is a view in perspective of a removable unit suitable for the mounting of Fig. 1.

The enclosure of Fig. 1 contains a removable unit 27 which is shown in greater detail in Fig. 2. It will be noted that the removable unit 27 includes a U-shaped supporting structure 29 having two legs 29A and 29B which are bent at right angles relative to a central section 29C. The legs 29A and 29B have at their lower ends (as viewed in Fig. 2) projections extending at right angles to the legs to form platforms 29D and 29E. Though not essential, the supporting structure may be slightly flexible to facilitate alignment of certain primary bars with connector units as described below.

Transformer means may be secured to either or both of the platforms 29D and 29E. Although two or more transformers may be secured to each of the platforms, it will be assumed that a transformer 31 is secured to the platform 29E and a transformer 33 is secured to the platform 29D. These transformers may be secured in any suitable manner as by machine screws 35.

Although voltage transformers may be mounted on the platforms, the transformers 31 and 33 are assumed to be current transformers. The transformers 31 and 33 may be of any desired construction. Preferably, however, they have rigid primary leads. Although the transformers may have wound primaries, in the preferred embodiment of the invention illustrated in Fig. 2, the transformers are of the through type. Thus, the transformer 31 has a primary bar 37 which extends therethrough. The parts of the round primary bar 37A and 37B which project from the casing of the transformer may be considered to be the primary leads of the transformer 31. The central part of the bar 37 which is located within the casing of the transformer may be termed the primary winding of the transformer. Similarly, the transformer 33 has a through bar 39 which provides primary former 33 has a through bar 39 which provides primary leads 39A and 39B. The transformer 31 has secondary terminals 41A and 41B, whereas the transformer 33 has secondary terminals 43A and 43B.

The elevated central part 29C of the supporting structure has a platform 45 secured thereto in any suitable manner as by machine screws 47. The platform 45 has secured thereto U-shaped brackets 49 on which a socket 51 is secured. The socket 51 may be of any conventional construction. It will be understood that the socket 51 has a plurality of contact jaws 53 which are positioned for reception of the contact blades of the socket meter to be associated therewith. The positions of the contact blades of standard socket meters will be understood from a study of pages 31 and 32 of the aforesaid Electrical Metermen's Handbook.

Although the enclosure 1 is illustrated in its vertical position in Fig. 1, it sometimes is desirable to mount the enclosure in a horizontal position. For this reason it is desirable to provide a construction permitting rotation of the socket 51 through an angle of 90° from its illustrated position. Such rotation may be effected in Fig. 2 by removing the screws 47 and rotating the platform 45 about a vertical axis to a new position 90° from the illustrated position. The screws 47 then may be replaced to secure the platform 45 to the supporting structure. It will be recalled that the ring 20 also may be rotated 90° in order to permit proper alignment of the cross bar 14 with the socket in either position of the socket.

The contact jaws 53 may be secured to the brackets 49 through suitable insulation. The construction of the insulation may be modified in accordance with the number of jaws required, and the positions of the jaws. In the specific embodiment of Fig. 2, three insulators 55, which may be constructed of a suitable insulation material such as porcelain, are secured to the brackets 49. Suitable securing means for the insulators are illustrated in Fig. 6. It will be noted that the insulator is secured to the bracket 49 by means of a bolt 57 which has a nut 59 embedded in the insulator. The upper end of the nut also serves as a nut for a machine screw 61 which secures the cross-bar 14 to the insulator. For certain contact jaw arrangements, portions of the cross-bar 14 may be omitted as well understood in the art.

It will be understood that connections from the secondary terminals 41A, 41B, 43A and 43B (Fig. 2) to the various contact jaws are provided by suitable conductors 63. Inasmuch as the transformers 31 and 33 are assumed to be current transformers, these connections provide current energization for the socket meter associated with the socket 51.

In addition, voltage energization for certain of the contact jaws is required. Such voltage energization conveniently is provided by means of clips 65 which are connected to the appropriate contact jaws by means of conductors 67. The clips 65 are of U-configuration, and are made of an electroconductive spring material such as spring copper. The legs of each clip are configured or curved to engage resiliently one of the primary leads of the transformers. By inspection of Fig. 2, it will be noted that each of the clips 65 is similar in construction to fuse clips which are commonly employed in the art. Inasmuch as the primary leads of the transformers are rigid and round, the clips 65 provide a convenient readily-detachable connection thereto. Wiring connections for various sockets will be understood by reference to pages 33 to 53 of the aforesaid Electrical Metermen's Handbook, which illustrate various meter wiring diagrams.

The removable unit of Fig. 2 is designed to be received releasably in the base section shown in Fig. 3. To this end, the rear wall 5 of the base section may have a plurality of studs 69 secured thereto. These studs are positioned for reception in openings 71 (Fig. ) provided in the platforms 29E and 29D and in flanges secured to the transformers 31 and 33. Although the studs 69 may be employed as dowels for positioning the removable unit, preferably nuts 69A are applied to the studs as shown in Fig. 4 for the purpose of releasably retaining the removable unit in the base section.

The base section of Fig. 3 is designed for reception of line and load conductors of a circuit to which the electrical instrument is to be connected. The number of conductors and their arrangement depend on the nature of the circuit. For example, the circuit may be a single-phase three-wire circuit, a poly-phase three-wire circuit, or a poly-phase four-wire circuit. Wiring diagrams for various circuits of this type are illustrated in the aforesaid Electrical Metermen's Handbook.

In the embodiment of Fig. 3, it will be assumed that three line conductors A1, B1 and C1 enter the base section through the bushing 15. Three load conductors A2, B2 and C2 leave the base section through a suitable opening such as that represented by the knockout section within the line 17. It will be assumed further that the line conductor B1 need not be coupled to the electrical instrument associated with the base section, but may be connected directly to the load conductor B2. It will be assumed further that the conductor B1 is not at ground potential and that it must be insulated from the base section.

A connection between the conductors B1 and B2 is established by means of an electroconductive strap 73 which is insulated from the base section by means of insulators 75 and 77. Connectors 79 and 81 are secured to the ends of the strap 73 for the purpose of releasably receiving the conductors B1 and B2 respectively. Referring to Fig. 1, it will be noted that the insulators 75 and 77 are secured to the wall 5 in any suitable manner as by machine screws 83.

The connector 81 has a body 81A which may be constructed of electroconductive material in any suitable manner as by casting the body from copper. The body 81A may be secured to one end of the strap 73 and to the insulator 77 in any suitable manner as by means of a bolt 85 which passes through the insulator and the strap and is in threaded engagement with the body 81A. The bolt 85 projects from the body 81A and has a nut 85A in threaded engagement therewith.

Four parallel guide posts 81B are formed on the body 81A to define a cruciform recess for slidable reception of a cruciform cap 87. The cap 87 has a pair of openings through which the bolts 85 pass. Consequently, by operation of the nuts 85A, the load conductor B2 may be clamped between the cap and the body of the connector. The connector 79 is similarly constructed. If desired, an insulating sleeve 73A may be slipped over the central part of the strap 73.

The four conductors A1, C1, A2 and C2 are to be connected releasably to the primary leads of the transformers 31 and 33. To this end, four connector units 89, 91, 93 and 95 are provided. These connector units are secured to the wall 5 of the base section, through insulators 89A, 91A, 93A and 95A substantially in the same manner by which the connector 81 is secured to the wall 5.

Referring more particularly to Figs. 3 and 5, it will be noted that the connector unit 91 has a body 91B which may be cast from an electroconductive material such as cast copper. The body 91B is associated with a cap 91C substantially in the same manner by which the cap 87 is associated with the body 81A. By operation of the nuts 85A, associated with the bolts 85 of the connector units 91, the line conductor C1 is clamped between the cap 91C and the body 91B. Preferably, the cap 91C and the body 91B have V-shaped grooves within which portions of the conductor C1 are received.

The body 91B also has an extension provided with a V-shaped groove 91D for reception of the primary lead 39A of the transformer 33. A cap 91E is releasably secured to the body 91B by means of machine screws 91F. Preferably, the cap 91E also has a V-shaped groove for reception of a portion of the primary lead 39A. By inspection of Fig. 5, it will be noted that the machine screws 91F may be operated to clamp the primary lead 39A between the cap 91E and the body 91B. Also, the screws 91F may be removed in order to release the primary lead 39A from the connector unit.

The construction of the connector units 89, 93 and 95 will be understood from the description of the connector unit 91. It will be understood that the parts of the connector units are positioned for reception of the primary leads and for reception of the conductors A1, C1, A2 and C2. Inasmuch as the conductors A1, C1, A2 and C2 may be heavy, the portions of the connector units designed to receive these connectors preferably are aligned with the openings through which the conductors enter or leave the base section. This materially facilitates the handling of the heavy conductors. The alignment of the cap 91C and the associated part of the body 91B with the conductor C1 is shown clearly in Fig. 3.

Parts of the connector units 89, 93 and 95 which correspond to the parts 91A, 91B, 91C, 91D, 91E and 91F of the connector unit 91 each will be identified by the appropriate reference character 89, 93 or 95 followed by the appropriate letter suffix.

The procedure for removing the transformers from the assembly illustrated in Fig. 1 now may be set forth. It will be understood that the meter 23 is releasably secured to the cover section 1 by means of a conventional sealing ring SR. When this sealing ring is removed the meter 23 may be withdrawn from its associated socket.

Next, the screws 61 are removed in order to release the bar 14 from the associated socket. If additional screws, locks, or latches are employed for the purpose of securing the cover section 1 to the base section 3, these screws, locks or latches are also released. The cover section now may be removed from the socket and the base section 3.

Referring next to Fig. 4, the machine screws 89F, 91F, 93F and 95F are released and the associated caps 89E, 91E, 93E and 95E are removed in order to free the primary leads of the transformers 31 and 33. The nuts 69A may be removed from their associated studs 69 in order to free the removable unit 27. The complete removable unit now may be removed from the base section for servicing or replacement as required.

It should be noted that the construction is particularly suitable for separate installation of the enclosure and the removable unit. For example, a contractor erecting a building may secure the base section 3, together with the connector units and the strap 73 illustrated in Fig. 3 in any suitable manner on the wall of the building which he is erecting. He may then connect the conductors A1, B1, C1, A2, B2 and C2, or certain of them, to the respective connector units. Finally, he may apply the cover section 1 (Fig. 1) to the base section by means of machine screws or latches (not shown), and may cover the opening in the cover section by means of a disc (not shown) which is secured to the flange 22 by means of the sealing ring SR.

When the owner of the building desires to receive electrical service, the public utility company which is to provide the service may then install the complete removable unit illustrated in Fig. 2 within the enclosure previously provided by the contractor. The public utility company also would mount the meter 23 on the enclosure.

Figure 8:
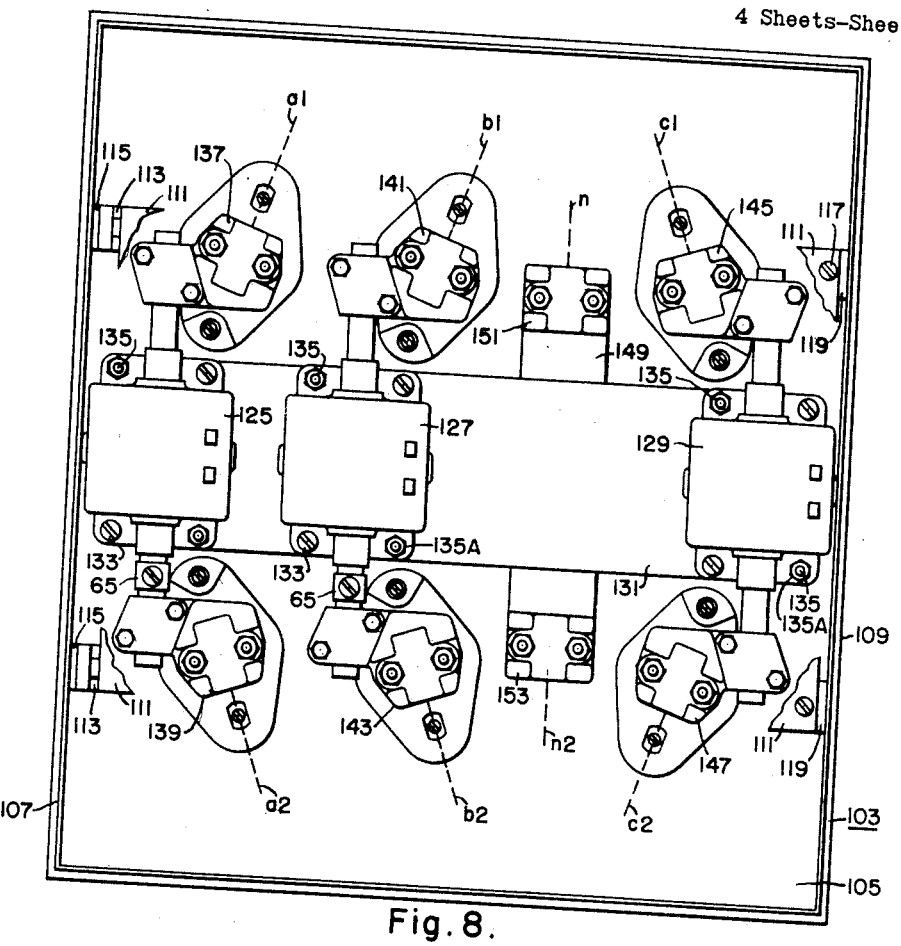
Fig. 8 is a view in front elevation, with the cover section removed and with parts broken away of the mounting illustrated in Fig. 7.
Figure 7:
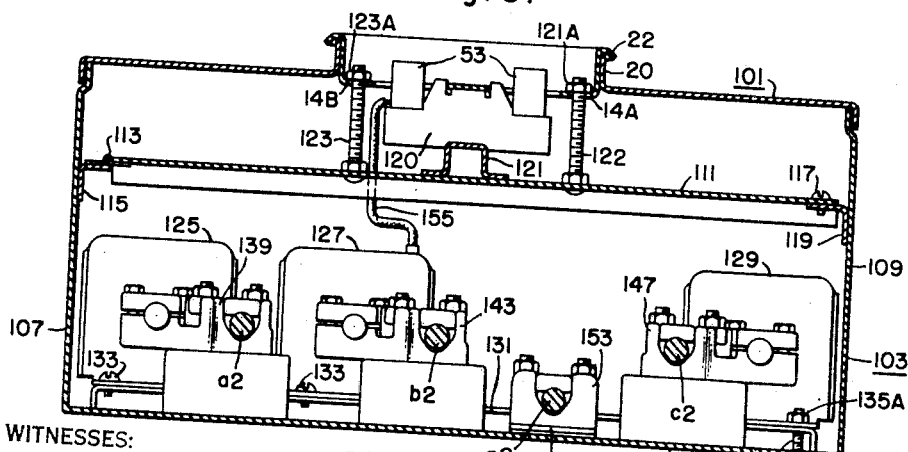
Fig. 7 is a view in cross-section of a mounting for electrical instruments embodying a modified form of the invention.

As previously pointed out, the transformer means mounted on the platforms 29E and 29D of Fig. 2 may comprise one or more transformers on each platform, and may include voltage and/or current transformers as desired. In Figs. 7 and 8 a modified construction is illustrated wherein three current transformers are mounted on a common platform.

In Fig. 7 an enclosure is shown which includes a cover section 101 and a base section 103. These correspond respectively to the cover section 1 and the base section 3 of Fig. 1, and may be similarly associated and constructed of a suitable material such as steel or aluminum. It will be noted that the cover section 101 has an opening surrounded by the flange 22 for reception of a socket meter. The flange 22 and the ring 30 are associated with the cover section 101 substantially in the same manner by which these parts are associated with the cover section 1 of Fig. 1. However, the cross-bar 14 of Fig. 1 has been modified in Fig. 7 by removal of the central portion thereof to leave two ears 14A and 14B. Such removal of the central part of the bar leave more room for the socket assembly jaws.

The base section 103 has a rear wall 105 and two side walls 107 and 109. A panel 111 is located within the enclosure and is connected by a hinge 113 to brackets 115 secured to the side wall 107. In the position illustrated in Fig. 7, the panel 111 is releasably secured by means of machine screws 117 to brackets 119 secured to the side wall 109.

A socket 120 is secured to a U-shaped bracket 121 which in turn is secured to the panel 111. Consequently, when the cover section 101 is removed, the screws 117 may be withdrawn to permit pivotal motion of the panel 111 and of the socket secured thereto through the position normally occupied by the cover section 101. When the cover section 101 is in the position illustrated in Fig. 7, it may be secured to the panel 111 in any suitable manner. For example, the panel 111 has a pair of studs 122 and 123 secured thereto. These studs project through openings in the ears 14A and 14B and have nuts 121A and 123A in threaded engagement with the exposed ends of the studs.

Energy for an electrical meter mounted on the enclosure of Fig. 7 is supplied in part through three current transformers 125, 127 and 129 which are secured to a common platform 131 by means of machine screws 133. The platform 131 is releasably secured to the wall 105 in any suitable manner. For example, studs 135 may be secured to the wall 105 and may project through openings in the platform 131 and in flanges secured to the transformers. Nuts 135A are applied to the free ends of the studs for the purpose of securing the platform and transformers releasably to the base section.

The transformers 125, 127 and 129 may be similar in construction to the transformers 31 and 33 of Fig. 2. The primary leads of these transformers are associated with connector units 137, 139, 141, 143, 145 and 147 in the same manner by which the primary leads of the transformers 31 and 33 are associated with the connector units 89, 91, 93 and 95 of Fig. 4.

It will be assumed that the equipment of Figs. 7 and 8 is intended for measuring energy supplied from a four-wire three-phase source having phase conductors a1, b1 and c1, and having a neutral conductor n which is at ground potential. The conductors a1, b1 and c1 are connected to the connector units 137, 141 and 145 in a manner which will be clear from the discussion of Figs. 1 to 6. Load conductors a2, b2, c2 and n2 also are illustrated in Fig. 8 by dotted lines. The conductors a2, b2 and c2 are associated with the connector units 139, 143 and 147 in a manner which will be clear from the discussion of the embodiment illustrated in Figs. 1 to 6.

Inasmuch as the neutral conductor n is at ground potential, an electroconductive strap 149 may be connected directly to the wall 105 of the enclosure. Connectors 151 and 153 are secured to the ends of the strap 149, and these connectors correspond to the connectors 79 and 81 of Fig. 3. It will be noted that the strap 149 passes between the platform 131 and the wall 105. Consequently, it does not interfere with removal of the platform 131 from the associated enclosure.

It will be understood that the panel 111 need be wide enough merely to support the socket 120. If desired, a connector block may be also mounted on the panel 111 in order to facilitate connections between the socket and the transformers and conductors located in the enclosure. The connections between the socket 120 and the transformers and conductors located in the enclosure may be effected through conductors such as the conductor 155 which is long enough and flexible enough to permit the desired motion of the panel 111 about the axis of the hinge 13. Clips 65 may engage primary leads of the transformers to provide voltage connections for the socket 120 in the manner discussed with reference to Figs. 2 and 4.

In order to remove the transformer assembly in the embodiment of Figs. 7 and 8, the nuts 121A and 123A are removed. In addition, any other screws, latches or locks employed for securing the cover section 101 to the base section 103 are released. The cover section 101 may then be removed.

Next the screws 117 are removed and the panel 111 is moved outwardly about the axis of its hinge to expose the transformer assembly.

The primary leads of the three transformers next are released from their associated connectors, and the nuts 135A are removed. The platform 131, together with the three transformers, now may be removed from the base section as a unit. The brackets 115 and 119 may be so positioned that they do not interfere with such removal of the transformer assembly.

Certain subject matter herein set forth is also set forth in the copending patent application of George J. Wey, Serial No. 245,391 filed concurrently herewith; which is now Patent 2,642,483.

Although the invention has been described with reference to certain specific embodiments thereof, numerous modifications of the invention are possible.

I claim as my invention:

1. In a device for receiving and substantially externally supporting an electrical instrument having terminal means, an enclosure having a base section and a cover section movable relative to the base section, a unit releasably positioned in said enclosure, said unit comprising a supporting structure and transformer means secured to the supporting structure, fastening means releasably securing the supporting structure to a portion of the enclosure other than the cover section, terminal means in the enclosure to be connected to the terminal means of an electrical instrument associated with the enclosure and positioned substantially externally of the enclosure, and connections for connecting the terminal means in the enclosure to the secondary leads of the transformer means.

2. A device as claimed in claim 1 wherein the transformer means includes a pair of transformers each having substantially rigid primary leads, said fastening means including connectors secured to a portion of the enclosure other than the cover section for releasably retaining said primary leads.

3. A device as claimed in claim 1 wherein the transformer means includes substantially rigid primary leads, and a connector having a resilient connector clip engaging one of the primary leads for connecting one of the primary leads to the terminal means in the enclosure, said clip being movable against its resilience clear of the associated primary lead.

4. A device as claimed in claim 1 in combination with a conductor located between a portion of the unit and a part of the enclosure other than the cover section, and means securing the conductor in insulated relationship to said part of the enclosure, said transformer means having projecting, substantially rigid primary leads, the supporting structure being located intermediate the conductor and the primary leads, whereby the unit may be removed from the enclosure without disturbing the conductor.

5. A device as claimed in claim 4 wherein the fastening means includes connectors insulated from each other and secured to a portion of the enclosure other than the cover section for releasably retaining the primary leads, each of the connectors including an auxiliary connector for receiving a conductor, whereby the primary leads may be connected through the connectors to suitable conductors.

6. A device as claimed in claim 4 wherein the supporting structure has a pair of legs and a connecting bridge defining a U-configuration straddling the conductor, the free ends of said legs engaging portions of the enclosure on opposite sides of the conductor.

7. In a device for receiving an electrical instrument having externally projecting contact blades, a supporting structure, a socket having contact jaws for receiving the contact blades of an electrical instrument, said socket being secured to the supporting structure, transformer means secured to the supporting structure, said transformer means having secondary leads, and electro-conductive connections extending between the secondary leads of the transformer means and certain of said contact jaws, said supporting structure constituting a base with the parts of the transformer means and the socket secured thereto, whereby the supporting structure, transformer means and socket may be handled as a unit during installations or servicing operations.

8. A device as claimed in claim 7 wherein the transformer means includes two transformers positioned on opposite sides of the socket, each of said transformers having substantially rigid primary leads projecting in opposite directions from said unit.

9. A device as claimed in claim 8 wherein the supporting structure is of U-configuration providing a pair of spaced bases for the transformers and a central elevated pedestal for the socket, whereby the space below the pedestal is available for wiring purposes.

10. A device as claimed in claim 8 wherein the electro-conductive connections include a resilient clip in resilient engagement with one of the primary leads, the resilient clip being separable from the associated primary lead by movement of the clip against its resilience away from the associated primary lead.

11. In a device for receiving a detachable instrument of the type having externally projecting contact blades; an enclosure having a base section and a movable cover section provided with an opening; and a unit located in the enclosure and comprising a socket having contact jaws accessible through said opening for receiving the contact blades of a detachable instrument, said unit comprising transformer means having secondary connections to certain of said contact jaws; said unit including the socket and the transformer means being removable complete as a unit from the base section when the cover section is separated from the base section and from the unit located in the enclosure.

12. In a device for receiving a detachable instrument of the type having externally projecting contact blades; an enclosure having a base section and a cover section provided with an opening; and a unit comprising a socket having contact jaws accessible through the opening for receiving the contact blades of a detachable instrument, and a pair of transformers positioned on opposite sides of the socket, said transformers having secondary connections to certain of said contact jaws and having rigid primary leads projecting therefrom; and connector assemblies secured to the base section for releasably retaining the primary leads, said unit being removable complete from the base section when the cover section is separated from the base section and the connector assemblies are released from the primary lead.

13. A device as claimed in claim 12 in combination with a conductor located in the base section, said unit having a channel clearing the conductor when the unit is in mounted position and permitting removal of the unit from the base section.

14. A device as claimed in claim 12 wherein the base section has an outlet area and wherein a pair of said connector assemblies have auxiliary connectors aligned with the outlet area whereby conductors passing through the outlet area may be received in the auxiliary connectors to establish connections therethrough to certain of the primary leads.

15. In a device for receiving an electrical instrument having first terminal means, an enclosure having a base section and a cover section, second terminal means located within the enclosure and secured to the base section, a hinged support located within the enclosure, means hinging the support to the base section for hinged movement from a closed position within the enclosure through the position normally occupied by the cover section to an open position exposing parts of the base section normally concealed by the hinged support when in closed position, third terminal means mounted on the hinged support for connection to the first terminal means of an electrical instrument, and electrical coupling means extending between the second and third terminal means, said electrical coupling means permitting said hinged movement of the hinged support.

16. A device as claimed in claim 15 wherein the electrical coupling means includes transformer means releasably secured to the base section and exposed when the hinged support is in the open position.

17. A device as claimed in claim 15 wherein the third terminal means comprises a meter socket for receiving the terminal blades of a socket meter.

18. A device as claimed in claim 17 wherein the cover section has an opening surrounded by a flanged ring for exposing the socket, whereby the terminal blades of a socket meter may be introduced through the opening for reception in the socket.

19. In a device for receiving an electrical instrument having terminal means, an enclosure having a base section, said enclosure including a cover section movable from a position covering a substantial part of the base section to a position exposing said part of the base section, a unit releasably positioned in the enclosure, said unit including a supporting structure and including transformer means secured to the supporting structure, fastening means releasably securing the supporting structure to the base section independently of the cover section, whereby movement of the cover section relative to the base section substantially exposes the unit, mounting means for mounting an electrical instrument on the enclosure substantially externally of the enclosure, terminal means in the enclosure to be connected to the terminal means of an electrical instrument positioned by said mounting means substantially externally of the enclosure, and connections for connecting the terminal means in the enclosure to the secondary leads of the transformer means.

20. In a device for receiving an electrical instrument having terminal means, an enclosure having a base section, said enclosure including a cover section movable from a position covering a substantial part of the base section to a position exposing said part of the base section, a unit releasably positioned in the enclosure, said unit including a supporting structure and including transformer means secured to the supporting structure, fastening means releasably securing the supporting structure to the base section independently of the cover section, whereby movement of the cover section relative to the base section substantially exposes the unit, mounting means for mounting an electrical instrument on the cover section substantially externally of the enclosure, terminal means in the enclosure to be connected to the terminal means of an electrical instrument positioned by said mounting means substantially externally of the enclosure, connector units secured in the enclosure to the base section, and releasable connections for connecting the primary leads of the transformer means to the connector units for energization, and connections for connecting the terminal means in the enclosure to the secondary leads of the transformer means.

21. In a device for receiving an electrical instrument having terminal means; an enclosure having a base section and a cover section movable relative to the base section; a plurality of connector units located in the base section and insulated from each other; each of the connector units including a first connector device for independently and releasably clamping a first electrical conductor in said enclosure, and each of the connector units including a second connector device for independently and releasably clamping a second electrical conductor in said enclosure; the first connector device and the second connector device in any one of the connector units respectively having portions electrically and rigidly connected to each other; a first pair of said first connector devices being aligned along a first line with each other, whereby first electrical apparatus having a pair of spaced and aligned terminals may have such terminals clamped respectively by the aligned first connector devices of said pair; and a bridge structure having a pair of legs connected at first ends of the legs to define a pedestal portion spaced from a wall of the base section, the second ends of the legs being releasably secured to the base section, whereby an electrical conductor may be interposed between the pedestal portion and the wall of the base section without interfering with removal of the bridge structure from the base section.

22. In a device for receiving an electrical instrument having terminal means; an enclosure having a base section and a cover section movable relative to the base section; a plurality of connector units located in the base section and insulated from each other; each of the connector units including a first connector device for independently and releasably clamping a first electrical conductor in said enclosure, and each of the connector units including a second connector device for independently and releasably clamping a second electrical conductor in said enclosure; the first connector device and the second connector device in any one of the connector units respectively having portions electrically and rigidly connected to each other; a first pair of said first connector devices being aligned along a first line with each other, whereby first electrical apparatus having a pair of spaced and aligned terminals may have such terminals clamped respectively by the aligned first connector devices of said pair; and a U-shaped bridge structure comprising a pedestal portion spaced from a wall of the base section and a pair of legs projecting from spaced ends of the pedestal portion to said wall, means releasably securing the legs to said base section, an electrical conductor located between said pedestal portion and said wall, and a contact jaw assembly secured to said pedestal portion for detachably receiving the terminal means of an electrical instrument, said cover section having an opening exposing said contact jaw assembly.

23. In a device for receiving an electrical instrument having terminal means; an enclosure having a base section and a cover section movable relative to the base section; a plurality of connector units located adjacent a wall of the base section and insulated from each other; each of the connector units including a first connector device for independently and releasably clamping a first electrical conductor in said enclosure, and each of the connector units including a second connector device for independently and releasably clamping a second electrical conductor in said enclosure; a portion of the first connector device and a portion of the second connector device in any one of the connector units being electrically and rigidly connected to each other; a first pair of said first connector devices being aligned along a first line with each other, whereby first electrical apparatus having a pair of spaced and aligned terminals may have such terminals clamped respectively by the aligned first connector devices of said pair; a second pair of said first connector devices being aligned along a second line parallel to, but spaced from, said first line, whereby electrical apparatus having a pair of spaced and aligned terminals may have such terminals clamped respectively by the aligned first connector devices of said second pair, a U-shaped bridge structure comprising a pair of spaced platforms adjacent said wall and a pedestal portion intermediate said platforms, said pedestal portion being spaced from the wall, said cover section having an opening exposing said pedestal portion.

24. A device as claimed in claim 23 in combination with a contact jaw assembly secured to said pedestal portion and exposed through said opening for detachably receiving the terminal means of an electrical instrument.

25. A device as claimed in claim 23 in combination with a contact jaw assembly exposed through said opening for detachably receiving the terminal means of an electrical instrument, and means selectively mounting the contact jaw assembly on the pedestal portion in either of two positions angularly displaced from each other relative to the enclosure about an axis extending through said opening, whereby the orientation of the enclosure relative to an electrical instrument mounted thereon may be adjusted.

26. A device as claimed in claim 25 wherein said opening is a circular opening in the cover section concentric about said axis, and a ring extending through said opening concentric with said axis, said ring and cover section having configurations trapping the ring in the cover section but permitting rotation of the ring relative to the cover section through a substantial angle about and means securing the ring to the contact jaw assembly.

27. In a device for receiving a detachable instrument having externally-accessible terminal means, an enclosure having a base section and a cover section, said cover section having a collar defining a circular opening, a contact assembly for receiving the terminal means of an electrical instrument, means selectively operable for mounting the contact assembly for exposure through said opening in either of two positions relative to the enclosure angularly displaced from each other about the axis of said circular opening, a ring located in said opening concentric with said axis and having spaced flanges respectively engaging the two ends of the collar, said flanges being spaced by a distance slightly larger than the length of the collar for rotatably holding the ring on the collar, said ring being rotatable relative to the collar about said axis for an angular distance at least as large as the angular displacement between said two positions of the contact assembly, and means securing the ring to the contact assembly.

28. In a device for receiving a detachable instrument having externally projecting contact blades, an enclosure having a base section and a cover section movable relative to the base section for providing access thereto, said cover having a circular opening therein, a contact jaw assembly located in said enclosure, said contact jaw assembly having contact jaws exposed through the opening for receiving the contact blades of a detachable instrument, a ring located in said opening concentric with the opening, said ring having projections overlying the cover section to retain the ring on the cover section, said ring being free to rotate about its axis relative to the cover section for a substantial angular distance, means releasably securing the ring to the contact jaw assembly to maintain a predetermined registration between the contact jaw and the ring, and means selectively securing the contact jaw assembly to the base section in either of two positions displaced from each other about the axis of the opening by an angle of substantially 90°, whereby the base section may be positioned on a supporting structure vertically or horizontally with a detachable instrument operably mounted on the enclosure in a predetermined orientation relative to the structure.

29. In a device for receiving a detachable electrical instrument having externally-accessible terminal means, a mounting structure, a registering device, said mounting structure and said registering device having configurations trapping the registering device on the mounting structure while permitting rotation of the registering device relative to the mounting structure about an axis extending through the registering device and the mounting structure, said registering device and the structure having registering openings through which said axis extends, said registering device providing a seat for engaging and positioning a detachable electrical instrument, a contact assembly exposed through said openings for engaging the terminal means of an electrical instrument positioned by said seat, means securing the registering device in a predetermined orientation relative to the contact assembly, and means for securing the contact assembly relative to the mounting structure selectively in either of two positions displaced from each other angularly about said axis.

30. A device as claimed in claim 29 wherein the mounting device has a collar concentric about said axis, said registering device comprising a ring positioned within and concentric with the collar, said ring having flanges at its ends extending over the respective ends of the collar to trap the ring relative to the collar while permitting relative rotation of the ring and the collar, one of said flanges constituting said seat.

References Cited in the file of this patent

UNITED STATES PATENTS

| Number | Name | Date |
|---|---|---|
| 2,145,546 | Kingdon | Jan. 31, 1939 |
| 2,242,637 | Young | May 20, 1941 |
| 2,249,075 | Young | July 15, 1941 |
| 2,438,454 | Riebe | Mar. 23, 1948 |
| 2,452,494 | Rathen | Oct. 26, 1948 |
| 2,483,815 | Easton | Oct. 4, 1949 |